United States Patent Office 3,365,428
Patented Jan. 23, 1968

3,365,428
POLYMERIZATION OF POLYAMIDE-PRECURSOR SALT IN THE PRESENCE OF A PHOSPHINIC ACID
Donald W. Wujciak, Union, N.J., assignor to Celanese Corporation, a corporation of Delaware
No Drawing. Filed Mar. 25, 1965, Ser. No. 442,795
14 Claims. (Cl. 260—78)

ABSTRACT OF THE DISCLOSURE

The time required for converting a polyamide-precursor material, more particularly a polyamide precursor salt of a diamine and carbocyclic dicarboxylic acid, e.g., hexamethylene diammonium terephthalate, to a fiber-formable polymer is materially lessened by carrying out at least the later stages of the polymerization in the presence of a small amount of at least one member of the group consisting of (a) acids of phosphorus represented by the general formula

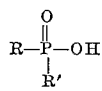

where R=an aryl or alkaryl radical, and R'=hydrogen or an alkyl, aralkyl, aryl or alkaryl radical, and (b) diamine salts of the acids of (a).

Examples of phosphorus-containing polymerization accelerators employed are phenylphosphinic acid and the hexamethylenediamine salt of phenylphosphinic acid.

---

This invention relates broadly to the art of producing condensation polymers and, more particularly, to an improved method of synthesizing high-molecular-weight polyamides capable of being formed into useful shaped articles, e.g., filaments (both mono- and multifilaments), films, tapes, ribbons, rods, tubes, etc.

Various methods heretofore have been proposed for the production of polyamides that are capable of being formed into filaments and other shaped articles that have the desired properties. For example, in the production of some of the commercial types of polyamides, a typical procedure is to first form an aqueous solution of a salt of the polyamide-forming monomers, e.g., a diamine and a dicarboxylic acid, and then polymerize the mass under the conditions specified to maintain the mass as a liquid until a polyamide having the desired properties has been formed. However, this method cannot be used in the case of certain polyamides, e.g., many of those melting above 275° C. that tend to degrade seriously and/or to polymerize to a useless infusible mass when it is attempted to prepare them by completely fusing the corresponding salt. Moreover, an additional operation requiring substantial expenditure of power is often required in order to obtain the fused polymer mass resulting from these processes in conveniently-handled form.

Another type of process for the production of high-molecular-weight polyamides employs the so-called "interfacial" technique, e.g., by this technique an aqueous solution of a diamine is contacted with an organic solvent solution of an acyl chloride of a dicarboxylic acid. However, this type of process is often economically unattractive due, for example, to the necessity of employing expensive starting reactants.

Other processes result in polymer with substantial differences in the size of particles obtained. This adds to the difficulty of producing uniformly shaped articles, e.g., filaments, from the polymer.

All of the aforementioned processes further suffer from the defect, which is reflected in the cost of preparing the product, of requiring a longer reaction period than is desirable for minimum manufacturing cost.

It is, accordingly, a primary object of the present invention to provide means whereby the reaction period required for preparing a high-molecular-weight polyamide can be materially reduced thereby to lower its manufacturing cost.

Other objects of the invention are to provide means for reducing the reaction period while at the same time providing means for making relatively undegraded polyamides of the type that tend to seriously degrade and/or polymerize to a useless infusible mass when prepared in the completely liquid state.

It is a further object of this invention to provide a process whereby there can be produced, in a shorter reaction period than heretofore has been possible, a linear condensation polymer in conveniently-handled form that is comprised of polymer particles more uniform in size than heretofore has been obtainable.

Still another object of the invention is to provide a more rapid process than previously has been possible whereby one can produce a difficultly-meltable polyamide, e.g., polyhexamethylene terephthalamide, having a relatively high and uniform molecular weight and further characterized by its particularly good spinning properties.

Other objects of the invention will be apparent to those skilled in the art from a consideration of the following more detailed description and from the appended claims.

In accordance with one aspect of the invention, a finely divided solid polyamide precursor, e.g., a salt of monomers containing carboxylic and amino groups, is polymerized by heating the precursor up to a polymerization temperature in the presence of a minor amount, i.e., a weight less than the weight of the polymer precursor, of a phosphorus compound that is effective in shortening the period of the reaction and which is hereafter sometimes designated as a "catalytic" phosphorus compound. Such phosphorus compounds are described more fully hereafter. The reaction also is preferably effected in the presence of a compound that is inert to the polymerization reaction and at least part of which remains in liquid form during such a reaction.

It was suggested prior to the present invention that polyamide-forming monomers, such as those used in making nylon, be polymerized in the presence of phosphorus compounds, e.g., phenyl phosphinic acid and organic salts thereof, specifically the hexamethylenediamine salt, in order to improve the affinity of the resulting linear polyamide for acid dyes (reference: British Patent No. 910,123). British Patent No. 898,889 corresponding to U.S. Patent No. 3,078,248 discloses the addition of an alkali-metal salt of phenyl phosphinic acid to a synthetic linear fiber-forming polymer prior to extrusion, more particularly prior to the polymerization reaction. The alkali-metal salt is added in order to permit the practical melt-spinning of linear polyamides, preferably polycarbonamides, having an increased concentration of amine end groups so that "drips" are eliminated or substantially reduced. The teaching is much the same in British Patent No. 902,906 as in the aforementioned British Patent No. 898,889 plus the added teaching that a combination of manganous hyposulfite and an alkali-metal phosphinate provides a nylon yarn that has been stabilized against the action of both heat and light without detrimentally affecting the properties of the yarn and its commercial processability. British Patents Nos. 902,905 and 902,907 teach the incorporation of salts, specifically metallic salts, into conventional fiber-forming polyamides to provide a yellow-inhibiting yarn.

Contrary to the teachings of the prior art, the present invention is based mainly on the applicant's discovery that in the case of certain high-melting or "difficultly-meltable" polyamides the reaction period required to form a fiber-forming (fiber-formable) polyamide can be materially reduced by effecting the reaction in the presence of certain catalytic phosphorus compounds hereafter more fully identified.

THE PRIMARY OR UNMODIFIED CONDENSATION POLYMER

The primary or unmodified condensation polymers to which the present invention is particularly applicable, and whereby the reaction time required for their preparation is materially lessened, are, for example, those fiber-forming linear polymers, more particularly linear polyamides, that are "difficultly-meltable" or have a higher melting point, e.g., above about 275° C., and especially those which are additionally characterized by the fact that they either cannot be melt-spun, or it is not commercially feasible to melt-spin, into fiber, film or other form. Polyamides having these characteristics may include those having repeating structural units represented by the formula

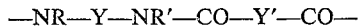

such polyamides resulting from the condensation of a dicarboxylic acid or a derivative thereof, e.g., a salt, acyl halide or ester of such an acid with a diamine, wherein the R's which may be the same or different, are hydrogen or monovalent organic radicals, e.g., lower alkyl such as methyl, ethyl, propyl through amyl (both normal and isomeric forms), and the Y's, which also may be the same or different, are divalent organic radicals such as alkylene, e.g., ethylene, tetramethylene, hexamethylene, etc.; arylene, such as meta- and para-phenylene, para- and meta-xylylene, and para- and meta-diethylene benzene, cycloalkylene such as 1,4-cyclohexylene and divalent heterocyclic radicals such as those derived from piperazine, and monoalkyl- and dialkylpiperazines, e.g., methyl- and dimethylpiperazines and monoethyl- and diethylpiperazines, wherein the open bonds are attached to the nitrogen atoms, and wherein the chemical structure of the polymer and/or the polymerization technique used is such that a relatively high-melting polymer is obtained.

An important group of polyamides within the above group and to which the present invention is especially applicable includes those in which Y and/or Y' is or contains a para- or meta-phenylene radical or a 1,4-cyclohexylene radical. Particularly important in practicing the instant invention are condensation products of a diamine and terephthalic acid or a derivative of terephthalic acid, e.g., terephthalyl chloride or a dialkyl terephthalate. Some specific polymers within this latter group are poly(polymethylene) terephthalamides wherein the polymethylene groups contain from 2 to 10 carbon atoms inclusive, e.g., polyhexamethylene terephthalamide, polyoctamethylene terephthalamide, polytetramethylene terephthalamide, polyethylene terephthalamide, and polypiperazylene terephthalamide. Other polyterephthalamides are poly(o-, m- and p-phenylene) terephthalamides, poly(o-, m- and p-xylylene) terephthalamides and poly(o-, m- and p-diethylenephenylene) terephthalamides, the latter produced, for example, by condensing an ester-forming derivative of terephthalic acid with para-bis(beta-aminoethyl)benzene. The polyterephthalamides can be shaped into filaments that exhibit a particularly good combination of properties, e.g., mechanical properties such as tenacity and elongation, and water-insensitivity as indicated by high wet stiffness and low shrinkage.

The process of the invention may be used also to prepare high-melting polyamides of aromatic acids other than terephthalic acid, e.g., of isophthalic acid, 2,6-naphthalenedicarboxylic acid, p,p'-dicarboxydiphenyl, (p,p'-dicarboxydiphenyl)methane, phenylenediacetic acid, phenylenedipropionic acid, and phenylenedibutyric acid where the diamine moities of the polyamides may be the same as those of the polyterephthalamides mentioned above, such as in polyethylene isophthalamide. In addition, the process may be used to make high-melting polyamides of (a) alkylene dicarboxylic acids such as adipic acid and (b) cyclic diamines such as p-xylene diamine and p-bis-amino-ethylbenzene.

THE INERT ADDITIVE

In accordance with a preferred embodiment of the present invention, a finely divided solid polyamide precursor, e.g., a salt of monomers containing carboxylic and amino groups, is polymerized by heating the precursor up to a polymerization temperature in the presence of (a) a minor amount, i.e., an amount that is less than the weight of the polymer precursor, of a compound that is inert in and during the polymerization reaction and at least part of which remains in liquid form during the polymerization reaction, and (b) a catalytic amount of a phosphorus compound of the kind hereafter more fully described for shortening the period of the reaction.

The inert compound preferably has an atmospheric boiling point of, for example, at least 110° C. In most instances, the atmospheric boiling point need not be higher than 300° C. The preferred range of atmospheric boiling point of the inert compound is 125° to 275° C., inclusive. The melting point of the inert compound may be, for example, in the range of −50° to 225° C., preferably −20° to 30° C.

In most instances, an amount of inert compound of at least 2.0 weight percent based on the weight of the polymer precursor is used. Preferably the amount of inert compound is within the range of 2.0 to 25 weight percent, inclusive, more particularly from about 5 to about 15 weight percent, based on the weight of the polymer precursor. The amount of inert compound is generally such that when it is mixed with polymer precursor at room temperature (20°–30° C.) or just above the melting point of the compound, whichever is higher, there is no pool of liquid observable to the naked eye. Moreover, although the mixture of polymer precursor and inert compound may feel damp to the touch, the inert compound is generally not used in an amount such that substantially all the particles cluster together, i.e., the mixture appears initially and before polymerization as a substantially granular mass of separate particles rather than as a paste or slurry.

The inert compound is preferably substantially immiscible with the polymer precursor, e.g., the initial salt, and the polymer product. Some inert compounds that may be used are, for example, aromatic ethers, more particularly ethers having at least one aromatic hydrocarbon radical, e.g., diphenyl ether, the ditolyl ethers, methyl phenyl ether, ethyl phenyl ether, the phenylnaphthyl ethers, etc.; aliphatic ethers, such as bis(2-ethoxyethyl)-ether, dibutyl ether and diamyl ether, etc.; hydrocarbons such as aromatic hydrocarbons, e.g., xylene, naphthalene, methylnaphthalenes such as alpha-methylnaphthalene, biphenyl, 2,2'-, 2,4'-, 3,3'- and 4,4'-dimethylbiphenyls, etc.; aliphatic and cycloaliphatic hydrocarbons such as the nonanes, the decanes and the dodecanes; decahydronaphthalene and tetrahydronaphthalene; petroleum fractions containing aromatic and aliphatic hydrocarbons, e.g., fractions having an atmospheric boiling point in the range of 125° to 300° C., e.g., kerosene and gas oil fractions; chlorinated hydrocarbons such as compounds commercially available under the name of Aroclors (chlorinated diphenyls); and high-boiling straight-chain alcohols, e.g., those having an atmospheric boiling point within the foregoing range, such as lauryl alcohol. Diphenyl ether is preferred as the inert compound for the purpose of this invention.

The inert additive is believed to function primarily as a heat-transfer medium in a solid-state polymerization of the kind with which this invention is concerned. Of particular interest among the many such media that were tested were xylene, water, alpha-methylnaphthalene and diphenyl ether. Of these four media, diphenyl ether was found to be the most desirable because (1) its use permitted lower pressures during polymerization than xylene; (2) lower total base loss during polymerization than water; and (3) easier removal from the polyamide by evaporation and, additionally, the production of lighter-colored polymer dopes than obtainable by using alpha-methylnaphthalene.

THE REACTION-ACCELERATING PHOSPHORUS COMPOUND

The reaction-accelerating or catalytic phosphorus (more particularly, organic phosphorus) compound used in practicing the present invention is, for example, an acid of phosphorus that may be represented by the general formula I 

wherein R represents a radical of the group consisting of aryl and alkaryl radicals, and R' represents a member of the group consisting of hydrogen, alkyl (including cycloalkyl), aralkyl, aryl and alkaryl radicals.

Instead of using an acid of phosphorus of the kind embraced by Formula I one may use an equivalent amount of an organic salt thereof, more particularly a diamine salt thereof.

Illustrative examples of radicals represented by R in Formula I are aryl, e.g., phenyl, biphenyl or xenyl, naphthyl, etc.; and alkaryl, e.g., tolyl, xylyl, ethylphenyl, propylphenyl, isopropylphenyl, butylphenyl, amylphenyl, etc. Illustrative examples of substituents represented by R' in Formula I are, in addition to hydrogen, organic radicals such as aryl and alkaryl radicals, examples of which have just been mentioned with reference to R; also, alkyl, e.g., methyl, ethyl, and propyl through eicosyl or higher in the homologous series (both normal and isomeric forms), cyclopentyl, cyclohexyl, cycloheptyl, etc.; and aralkyl, e.g., benzyl, phenylethyl, phenylpropyl, phenylisopropyl, phenylbutyl and higher members of the homologous series. The radicals represented by R and R' may be the same or different.

Specific examples of acids of phosphorus embraced by Formula I will be apparent to those skilled in the art from a consideration of this formula and the numerous examples of substituents represented by R and R'. Preferably phenyl (i.e., monophenyl) phosphinic acid is used, the formula for which is II 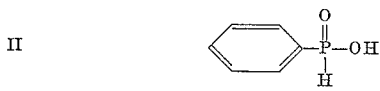

Examples of organic, specifically diamine, salts that may be employed in place of the phosphorus-containing acid itself are those obtained by reacting equivalent amounts of the chosen acid of phosphorus with a diamine represented by the general formula $NH_2-(CH_2)_n-NH_2$ where $n$ represents an integer that is at least 2, and preferably from 2 through about 20. Examples of such diamines are: ethylenediamine, trimethylenediamine, tetramethylenediamine, pentamethylenediamine, hexamethylenediamine, heptaethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine and nonadecamethylenediamine.

The diamine used in making the salt of the phosphorus-containing acid is preferably the same as that employed in preparing the high-molecular-weight condensation polymer; however, the diamines may be different, if desired.

The acid of phosphorus and/or an organic, specifically diamine, salt thereof are used in a mole percent at least sufficient to reduce the polymerization reaction time below that normally required when the reaction is carried out in the absence of this reaction accelerator, e.g., from 0.05 to 5 mole percent, preferably from 0.1 to about 1 mole percent, of the molar amount (i.e., based on the number of moles) of the polymer precursor(s). Obviously, no more reaction accelerator should be used than that required to obtain the desired results.

The reaction accelerator (i.e., phosphorus-containing accelerator) may be added to the reaction vessel at any convenient stage prior to or during the polymerization reaction, but is preferably added prior to the polymerization of the polyamide precursor(s) to insure complete mixing and intimate contact of the phosphorus-containing accelerator with the polymer precursor(s). The addition of the accelerator is made most conveniently as a solution or mixture with the inert compound described in the previous section. It will be understood, of course, that this invention does not preclude adding the acclerator just prior to the second- or post-heating stage wherein the initial polymer of relatively low molecular weight is increased to a fiber-forming polymer of substantially higher molecular weight.

For convenience and simplicity in describing the general procedure, and wherein there is preferably utilized an inert compound or adidtive of the kind above set forth, the reaction accelerator will be described as being introduced and being present along with the inert compound, e.g., diphenyl ether.

GENERAL PROCEDURE

The process is preferably carried out by heating a mixture of polymer precursor(s), reaction accelerator and, preferably also, the above-described inert compound to polymerization temperatures under autogenous pressure and while moving the precursor particles with respect to one another until the initial polymerization reaction has proceded to a substantial degree, preferably to about equilibrium as indicated, for example, by a leveling out in the rate of pressure rise when the reactor is closed. By "autogenous pressure" is meant a pressure at least partially developed by retaining vapors produced during the heating and polymerization, e.g., product vapors such as water of reaction and, in some cases, vapors of a volatile reactant originally tied up in the precursor, e.g., a diamine such as hexamethylenediamine, and/or the inert compound. While this is preferably accomplished by retaining all of the vapors produced during this period, i.e., carrying out the polymerization in a closed vessel, it may also be achieved by allowing the vapors to escape at a rate lower than that at which they are produced or by allowing the pressure to build up by one of the aforesaid methods and maintaining said pressure constant by allowing the vapors to escape at a rate about equal to that at which they are produced. The pressure at the beginning of the polymerization at autogenous pressure may be close to atmospheric or may be higher than atmospheric, e.g., up to 500 p.s.i.g. due to the presence of vapors, e.g., of an inert gas such as nitrogen, helium or argon, in the reaction zone.

The maximum pressure reached during the autogenous pressure step is suitably in the range of 300 to 1200 p.s.i.g., preferably in the range of 600 to 1000 p.s.i.g.

The period of polymerization under autogenous pressure, i.e., from the start of polymerization as indicated by a sudden rise in the rate of pressure build-up to the point at which the pressure in the reactor is substantially reduced by venting, may vary, for example, from about ½ hour to about 6 hours or more. In many cases the polymer precursor, e.g., salt, is charged to the reactor together with the reaction accelerator (or both said accelerator and the inert compound) at room temperature, the reactor closed, and the precursor heated up to polymerization temperature in the closed reactor, e.g., in a time period within the range of about ¼ to about 5 or more hours.

The polymerization temperature or temperatures during the autogenous pressure step is generally within the range of from about 60° C. below the melting point of the original precursor up to the melting point of the mass at any point during the polymerization. However, the heat transferred into the mass during polymerization should not at any time be sufficient to completely or substantially liquefy the mass, e.g., by melting or dissolution in the water of reaction or in any other liquid that may be present. The polymerization under autogenous pressure is considered to have begun at the initial sharp rise in pressure in the polymerization zone. After the reaction has proceeded to a certain extent so that the melting point of the mass is higher than that of the original precursor because of the degree of polymerization which has occurred, the reaction mass may be heated to a temperature above the melting point of the original precursor.

Since the presence of even small amounts of oxygen during the polymerization reaction may increase the difficulty of shaping the polymer, and adversely affect the properties of the final shaped article, it is desirable to exclude this element from the polymerization zone as much as possible. This may be accomplished, for example, by pressurizing the charged reactor with an inert gas such as nitrogen, helium, argon, etc., e.g., to a pressure in the range of 50 to 250 p.s.i.g., venting the reactor to atmospheric pressure and repeating this several times both at room temperature (20°–30° C.) and at an elevated temperature that is, however, below the temperature of polymerization, e.g., at 50° to 225° C., inclusive.

In a preferred method of carrying out the process, oxygen is excluded from the reactor charged with a mixture of (a) substantially dry salt as the polymer precursor, (b) reaction accelerator, e.g., phenyl phosphinic acid, and, preferably also, (c) inert compound in the absence of a readily observable liquid phase, using a procedure such as that described above. The salt is then heated up to polymerization temperature with constant stirring or agitation, at which point the water of reaction may form a liquid phase in which the low polymer is dispersed. As the polymerization proceeds, the temperature of the mass is raised above the initial reaction temperature and above the melting point of the initial salt. After a sufficient degree of polymerization has occurred under autogenous pressure, the reactor is vented to a lower pressure, e.g., atmospheric pressure, during which the water of reaction and most of the inert compound are vaporized and withdrawn leaving a solid mass of substantially dry-appearing polymer in the reactor.

As an alternative method of excluding oxygen from the system, and in accordance with another aspect of the invention, an amount of water or some other relatively volatile inert liquid is initially added to the reaction zone with the mixture of polyamide precursor, e.g., the corresponding salt, the reaction accelerator and, preferably also, the relatively non-volatile inert compound, e.g., diphenyl ether. The mass is heated under autogenous pressure to a temperature at which a substantial portion of the volatile liquid is vaporized but below the temperature at which substantial polymerization occurs, e.g., in the range of about 60° to 160° C. below the melting point of the salt if a salt is used as the polymer precursor. The maximum pressure reached during this step is, for example, in the range of 10 to 150 p.s.i.g., and at least part of the vaporized excess water or other volatile liquid is subsequently vented from the reaction zone. In venting, the pressure in the reaction zone may be reduced, for example, to a value in the range of the vapor pressure in the reactor at the temperature of venting down to substantial vacuum. Preferably, however, the pressure is reduced to atmospheric on venting. The vaporized water or other volatile liquid exuding from the reaction zone has a tendency to flush out any oxygen which is present so that the main reaction under autogenous pressure may be subsequently carried out in the substantially complete absence of oxygen. The amount of water or other volatile liquid initially present may vary within a wide range, e.g., 1 to 100% or higher, preferably 2.5% to 7.0% or higher, based on the weight of the polymer precursor.

In some instances the presence of an initial excess of water in the reaction zone, e.g., 0.1 to 5.0 weight percent, based on the weight of the polymer precursor, is advantageous in terms of the properties of the polymer obtained, e.g., high inherent viscosity and greater degree of product uniformity.

While the polyamide precursor initially employed in the process is preferably a salt of the monomeric reactants, e.g., of a diamine and a dicarboxylic acid of the kind hereinbefore mentioned, it may also be some other polymer precursor, e.g., a low-molecular-weight amide of a diamine and a dicarboxylic acid. In general, the autogenous pressure step of this invention results in a polymer having an inherent viscosity of at least 0.3 measured at 0.4 gm. per deciliter in concentrated $H_2SO_4$ at 25° C.

After the reaction under autogenous pressure has been concluded, the polymer may be suitable for forming into useful shaped articles. However, it is desirable in many cases to further polymerize the mass. Thus, in accordance with another aspect of the invention, the pressure in the reaction zone is slowly reduced by venting to a substantially lower level, e.g., in the range of from about 100 p.s.i.g. down to the vapor pressure of the reaction mass at the reaction temperature which is generally in the sub-atmospheric range. Preferably, the pressure is reduced to atmospheric. The pressure reduction may be suitably carried out within a period of, for example, 10 to 120 minutes. The temperature of the mass during the pressure reduction is kept at a level sufficient to sustain additional polymerization reaction and up to the melting point of the mass. However, the amount of heat transferred should not be great enough to completely melt the polymerizing mass or to substantially decompose the polymer.

After the pressure reduction has been completed, the mass is preferably kept at the lower pressure for an additional reaction period, e.g., of at least 5, preferably 60 to 180 minutes. The temperature during the pressure reduction and the polymerization cycle at the lower pressure is below the melting and decomposition points of the polymer at any time and is suitable within the range of 250° to 325° C., preferably within the range of 265° to 290° C. for higher melting polymers.

Preferably, the presence in the system of potential impurities, e.g., diphenyl ether or water, is kept to a minimum by pressurizing the reaction zone with an inert gas such as nitrogen, helium or argon to a moderate pressure, e.g., about 50 to 150 p.s.i.g., and venting to atmospheric pressure several times during the final heating stage at a relatively low pressure within the above range.

The reaction is preferably carried out under conditions such that the stoichiometric quatities of monomeric reactants are substantially maintained. In the case of a polyamide of a dicarboxylic acid (more particularly an aromatic dicarboxylic acid, e.g., terephthalic acid) and a diamine, the difference between each of the combined monomers present in the final polymer and the stoichiometric amount capable of reacting with the total amount of the other combined monomer present in the polymer is preferably within the range of +1.5 to −1.5 mole percent of such stoichiometric amount. Moreover, when a salt is employed as the polymer precursor, the difference between the total amount of each of the combined monomers in the polymer, and the total amount of the corresponding monomer in the initial salt is preferably within the range of +1.5 to −1.5 mole percent of the latter amount. For example, if hexamethylene diammonium terephthalate salt is polymerized to polyhexamethylene terephthalamide, the amount of combined terephthalic acid in the final polymer is preferably in the range of 0.985 to 1.015 moles per mole of terephthalic acid in the initial salt.

As stated above, the reaction is generally carried out while moving the particles with respect to one another. The desired movement may be accomplished, for example, by stirring or agitating the particles while they are being kept at the desired temperature. Another method of accomplishing the required movement is to vibrate or rock the reaction vessel during the reaction.

In accordance with another aspect of the invention, a polymer is prepared from a solid finely divided polymer precursor material by heating the mass to polymerization temperatures that are not high enough to melt the mass completely, e.g., as described above and while keeping the temperature of walls of the reaction zone substantially uniform, e.g., such that the difference in temperature between any one point of the walls of the reaction zone and any other point is no higher than 50° C. This may be accomplished, for example, by circulation of heat-transfer fluids, and the use of electrical heating elements if necessary.

An indication of the ability of a polymer to be formed into a shaped article such as a filament of desirable properties is its "plugging value," which is inversely related to the tendency of a solution of the polymer to plug the pores of a filter. The plugging value may be determined, for example, by filtering a dilute solution of the polymer through a standard filtering medium at standard conditions of pressure drop and temperature, measuring the volume of filtrate at definite time intervals, plotting $t/V$ as the ordinate against $t$ as the abscissa where $t$ is the time and $V$ the corresponding volume of filtrate, multiplying the reciprocal of the slope of the resulting straight line by the polymer concentration and dividing by the area of the filter. The units may be chosen so that the plugging value is given in grams per square centimeter.

In some instances, a plot of $t/V$ versus $t$ does not yield a continuous straight line. In these cases, the plugging value is determined by plotting points of $t/V$ versus $t$ for a substantial degree of plugging, e.g., over 50%, and drawing the best straight line through the points representing the highest degree of plugging. The plugging value is then calculated from the slop of this line as described above.

In addition to shortening the reaction period, the process of this invention also provides a very uniform product having high inherent viscosities and plugging values. Thus, there is less variation in particle size in the product obtained by the method of the instant invention than in the product obtained from other processes resulting in a solid granular product, and there is also less variations in inherent viscosity between particles of different sizes. Furthermore, this improved uniformity is obtained without the necessity for a large expenditure of power necessary to break up coarser particles into finer ones.

As has been indicated hereinbefore, the process of this invention is particularly applicable and valuable in the production of polyhexamethylene terephthalamide from the corresponding salt, hexamethylene diammonium terephthalate. In the preferred procedure of preparing this polymer, a mass of a mixture of (a) the substantially dry salt, (b) the reaction accelerator and (c) the inert compound is charged to a reaction zone capable of being shut off from the atmosphere. Some free hexamethylenediamine or terephthalic acid in an amount of 0.0 to 1% by weight of the salt may also be charged to the reaction zone with the salt. The vapor space of the reaction zone is then pressured with nitrogen, after being closed to the atmosphere, e.g., to 80 p.s.i.g. and vented to atmospheric pressure. This procedure is repeated several times both at room temperature and at an elevated temperature that is, however, below the temperature at which polymerization is initiated, e.g., 150° C., to reduce the presence of oxygen. The mass is then further heated in a period within the range of about ¼ to 2 hours or much longer, e.g., about 4 hours, to a temperature of at least 240° C., preferably above 265° C. under autogenous pressure that reaches a maximum in the range of about 500 to 1000 p.s.i.g. or higher. The mass is polymerized under autogenous pressure for a period of about 10 to 150 minutes during which the temperature may be raised further to a level in the range of, for example, 260° to 325° C.

The reaction zone is then again opened to the atmosphere and the pressure reduced slowly within a period of about 10 to 90 minutes, to a minimum pressure in the range of the vapor pressure of the reaction mass up to 100 p.s.i.g., preferably 1 atmosphere. The reaction is completed at the latter pressure and a temperature in the range of, for example, 260° to 300° C. for an additional period in the range of from about 5 to 300 minutes. The reaction zone may be pressurized with an inert gas such as nitrogen to a pressure of about 50 to 150 p.s.i.g., e.g., 80 p.s.i.g., and vented to atmospheric pressure one or more times during the latter heating step, if it lasts, for example, more than 30 minutes, for the purpose of reducing water, and inert-compound content in the polymerization zone to a minimum.

As an alternative procedure, the hexamethylene diammonium terephthalate salt, containing added (or together with) reaction accelerator if not already present, is charged to the reactor with excess water, e.g., 1 to 100% based on the weight of the salt. The reactor is then sealed and the mass is stirred while it is heated, for example, to a temperature in the range of 110° to 190° C. and a corresponding pressure in the range of 5 to 150 p s.i.g. Under these conditions, the salt may dissolve completely in the water at the higher water contents, but the polymerization reaction is not initiated. The solution may be held under these conditions for a period sufficient to insure complete solution of the salt, after which the reaction zone is opened to the atmosphere and excess water is bled off slowly. The reactor may be vented to atmospheric pressure or alternatively, an amount of free water, e.g., 0.1 to 25% based on the weight of the salt, may be left in the reactor for the polymerization at autogenous pressure. The polymerization may then be carried out as described above. Or, if desired all of the reaction accelerator may be added at this point instead of adding it earlier in the procedure as hereinbefore described.

The venting of water vapor provides for additional flushing of oxygen from the system, and the retention of some free water in the system on heating to polymerization temperatures is capable of yielding polymer of higher inherent viscosity and greater degree of product uniformity.

By means of the process of this invention, polyhexamethylene terephthalamide polymers may be easily and economically obtained that have inherent viscosities above 1.5 or 1.7, and, also, plugging values of at least 0.3 or 0.5, preferably 0.5 to 5.0. In particular, polymers having an inherent viscosity of at least 1.8, preferably 1.8 to 2.5, and a plugging value of at least 0.5 can be obtained in a shorter reaction period than heretofore has been possible. These polymers are capable of being formed into useful shaped articles of particularly desirable properties, e.g., by the sulfuric acid wet-spinning process described in U.S. Patent No. 3,154,610 dated Oct. 27, 1964, and assigned to the same assignee as the present invention.

In order that those skilled in the art may better understand how the present invention can be carried into effect, the following examples are given by way of illustration and not by way of limitation. All parts and percentages are by weight unless otherwise stated.

Example 1

This example illustrates the preparation of a polyamide-precursor, more particularly a salt of a diamine, specifically hexamethylenediamine, and a dicarboxylic acid, specifically terephthalic acid.

Finely divided hexamethylenediamine terephthalate salt is prepared by charging to a salt-preparation vessel, provided with agitating and heating means, 275 lbs. of deionized water and 90 lbs. of a 60 wt. percent solution of hexamethylenediamine in water, whereupon the temperature of the mixture rises to about 40° C. from the heat of solution of the amine. Without agitation, 90 lbs. of terephthalic acid is added to the amine solution. The heat of reaction raises the temperature to about 50°–55° C. The mixture is then heated with agitation to 95° C. At this temperature the pH is generally about 5.5 with considerable undissolved acid present. Additional hexamethylenediamine solution is added until the pH reaches 7.5 ±0.05. About 20 lbs. of amine solution is usually needed to adjust the pH. Additional terephthalic acid may be used to lower the pH if required. The solution, which contains about 30 wt. percent salt, is kept at 95° C. from this stage until it reaches a crystallizer unit.

The hot solution is decolorized with 2.7 wt. percent (on salt) of finely divided activated carbon (Darco S51) admixed with about 0.65 wt. percent (on salt) of a filter aid, specifically diatomaceous earth. It is filtered hot and cooled to 25° C. in a stirred crystallizing vessel. The resulting slurry of crystallized salt is centrifuged to a cake containing 16–18% moisture of which about 13.5% is water of hydration of the crystalline salt and the remainder is adhering mother liquor. The mother liquor, which contains about 30 to 40% of the initial salt charge, can be recycled to the next batch of salt.

The salt is dried at a suitable temperature, e.g., at about 75° C., to a moisture content of 0.5% or less using a suitable oven such as an air-convection or a vacuum oven, or continuous drying equipment such as a rotary, a fluidized-bed or a stirred-vacuum dryer. The dry salt is a very finally divided material. The pH of a 1% aqueous solution of the salt in triple-distilled water is usually from 7.15 to 7.40, and the color of a 5% aqueous solution of the salt is less than 5 on the Hellige Aqua-Tester No. 611.

Example 2

This example illustrates a typical procedure for the preparation of a fiber-formable linear polyamide by the condensation polymerization of hexamethylene diammonium terepththalate salt in the absence of a polymerization-reaction accelerator of the kind used in practicing this invention.

The finely divided substantially anhydrous salt, produced as described under Example 1, is charged to a stirred autoclave, at the rate of 3.1 lbs. salt per gallon of autoclave capacity. The reactor is closed and purged with nitrogen to remove air. The mixture is then stirred and heated to 150° C. at which temperature the reactor is again purged with nitrogen to remove traces of air and moisture. Thereafter the reaction mixture is heated to 293°–294° C.

As the salt polymerizes, water vapor released by the reaction raises the pressure in the reactor to about 800 p.s.i.g. At this point (293°–294° C.; 800–830 p.s.i.g.), the vapors in the reactor are vented slowly, taking 45 minutes to reduce the pressure in the reactor to 0 p.s.i.g. During venting, most of the water of reaction flows out of the reactor and the temperature of the polymer drops to about 272° C. when venting has been completed.

The polymer is then held (i.e., "post-heated") at 275°–280° C. for 1.5 hours to increase its inherent viscosity to that desired or required for optimum properties when formed into a fiber, film or the like. (Parenthetically it may here be mentioned that it is this post-heating time to increase the inherent viscosity that surprisingly and unobviously is materially lessened in practicing the present invention. Additionally, other valuable and unobvious advantages herein described are attained.)

After post-heating as described for 1.5 hours, the polymer is cooled to 50° C. and dropped out of the reactor. The inherent viscosity (I.V.) is between 1.5 and 2.5, specifically 2.10. The plugging value (P.V.) is between 0.1 and 0.3.

Example 3

This example illustrates the results obtained when a polymerization-reaction accelerator is used to shorten the reaction period.

Same as in Example 2 with the exception that 0.1 mole percent of a polymerization-reaction accelerator or catalyst, specifically phenyl phosphinic acid, based on the mole percent of terephthalate salt, is added to the autoclave together with the terephthalate salt.

In this case a heating of only 30 minutes of second-stage or post-heating is required in order to obtain a linear polyamide having approximately the same I.V. as that obtained in Example 2 after a post-heating period of 1½ hours.

Example 4

This example illustrates a preferred embodiment of the invention wherein both a reaction accelerator and an inert additive are employed.

Same as Example 3 with the exception that, in addition to 0.1 mole percent (same basis as in Example 3) of phenyl phosphinic acid and hexamethylene diammonium terephthalate salt, there is added to the autoclave 10 wt. percent, based on the weight of the salt, of an inert additive, specifically diphenyl ether. More detailed operating conditions and results are tabulated below:

Pressure stage, max. temp., ° C. ------------------ 287
Maximum pressure, p.s.i.g. --------------------- 800
2nd stage, minutes ---------------------------- 30
I.V. ------------------------------------------ 2.08
P.V. ------------------------------------------ 1.9

Example 5

Same as in Example 4 with the exception that 1, instead of 0.1, mole percent (same basis as in Example 3) of phenyl phosphinic acid (PPA) is used. More detailed operating conditions and results are tabulated below:

Pressure stage, max. temp., ° C. ------------------ 288
Maximum pressure, p.s.i.g. --------------------- 800
2nd stage, minutes ---------------------------- <30
I.V. ------------------------------------------ 2.10
P.V. ------------------------------------------ 2.1

As has been indicated hereinbefore, the main advantage of using a reaction-accelerator or catalyst of the kind with which this invention is concerned is to decrease the reaction time, more particularly at the high temperatures that are required to reach the desired I.V. levels. The time saved amounts to about 75 minutes and 60 minutes in 50 gallon and 2 gallon reaction units, respectively, when the reaction accelerator, specifically phenyl phosphinic acid, is added at the 1 mole percent level and all other reaction conditions are maintained substantially the same.

Example 6

This example illustrates the use of a diamine salt of a phosphorus-containing acid of the kind embraced by Formula I, specifically a hexamethylenediamine salt of phenyl phosphinic acid (PPA), which salt may be designated for brevity as HMD-PPA salt.

The procedure is the same as in Example 4 with the exception that 0.45 mole percent (same basis as in Example 3) of HMD-PPA salt is used instead of 0.1 mole percent PPA. More detailed operating conditions and results are tabulated below:

| | |
|---|---|
| Pressure stage, max. temp., ° C. | 287 |
| Maximum pressure, p.s.i.g. | 800 |
| 2nd stage, minutes | <30 |
| I.V. | 2.16 |
| P.V. | 1.1 |

*Example 7*

Same as in Example 6 with the exception that there is added 0.45 mole percent HMD-PPA and 0.4 mole percent of another reaction accelerator, more particularly a diamine and specifically hexamethylenediamine (HMD). The mole percentages of the aforesaid additives are based on the molar amount of terephthalate salt. More detailed operating conditions and results are tabulated below:

| | |
|---|---|
| Pressure stage, max. temp., ° C. | 287 |
| Maximum pressure, p.s.i.g. | 800 |
| 2nd stage, minutes | <30 |
| I.V. | 1.84 |
| P.V. | >2 |

The following additional general remarks may be made with regard to Examples 3 through 7 and comparable runs.

Using 0.1 mole percent PPA, higher I.V.'s (by about 0.1 unit on the average) are obtained than comparable runs made in the absence of a compound of the kind embraced by Formula I, specifically PPA. Furthermore the higher I.V.'s, which also are accompanied by good P.V.'s are obtained in runs wherein the reaction time has been materially lessened as herein before described. Such results were very surprising, wholly unobvious and in no way could have been predicted from the teachings of the prior art.

With 1 mole percent PPA the effect of the reaction accelerator is increased over the use of 0.1 mole percent PPA such that only after eliminating one hour of heating time is the desired level of I.V. obtained. P.V. levels are also good.

The above remarks are also generally applicable when using HMD-PPA salt (0.45 mole percent). Using HMD in addition to HMD-PPA salt also gives a polyamide with a good I.V./P.V. relationship although with a slightly lower I.V. than when the HMD is omitted.

Other unobvious advantages and results accrue from practicing the instant invention. For instance, the linear polyamides of Examples 3 through 7 are characterized by a decreased tendency to adhere to the metal agitator of the reactor in which they are prepared. Surprisingly, too, the loss of base during polymerization in the presence of the phosphorus-containing reaction accelerator, specifically PPA and HMD salt of PPA, is less by about 23% than the loss of base that occurs when polymerization is effected in the absence of the said reaction accelerator. Furthermore, the percentage decrease in loss of base appears to be independent of the amount of reaction accelerator that is employed.

In general, the increased reaction rate that results in lessening the total reaction time occurs after the equilibrium point has been reached at the end of the first stage of heating and only after venting of the reactor has started.

*Example 8*

Examples 4 and 5 are repeated with the exception that instead of 0.1 and 1 mole percent of phenyl phosphinic acid there are used in individual runs 0.1 and 1 mole percent, respectively, of other phosphorus-containing acids of the kind embraced by Formula I, specifically:

(a) Diphenyl phosphinic acid

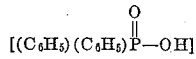

(b) Naphthyl phosphinic acid (mononaphthyl phosphinic acid)
(c) Tolyl phosphinic acid (monotolyl phosphinic acid)
(d) Biphenylyl phosphinic acid (monobiphenylyl phosphinic acid)
(e) (Phenyl)(methyl) phosphinic acid
(f) (Phenyl)(benzyl) phosphinic acid
(g) (Phenyl)(cyclohexyl) phosphinic acid
(h) Ditolyl phosphinic acid.

Similar results are obtained.

Instead of the foregoing acids of phosphorus, one may use an equivalent molar amount of a salt of any of the foregoing acids with a diamine, e.g., hexamethylenediamine or any other diamine embraced by the formula $NH_2-(CH_2)_n-NH_2$ where $n$ represents a number from 2 through 20, numerous examples of which have been given hereinbefore.

*Example 9*

Example 5 is repeated with the exception that instead of the hexamethylene diammonium salt there are used, in individual runs, the following salts:

(a) Pentamethylene diammonium terephthalate salt
(b) Heptamethylene diammonium terephthalate salt
(c) Octamethylene diammonium terephthalate salt
(d) Pentamethylene diammonium isophthalate salt
(e) Hexamethylene diammonium isophthalate salt
(f) Hepatmethylene diammonium isophthalate salt
(g) Octamethylene diammonium isophthalate salt.

Similar results are obtained.

*Example 10*

Examples 4 and 5 are repeated with the exception that instead of PPA alone there is used in individual runs (a) 0.05 mole percent of PPA plus 0.05 mole percent of HMD salt of PPA, and (b) 0.05 mole percent of PPA plus 0.5 mole percent of the HMD salt of PPA. Similar results are obtained.

*Example 11*

Examples 4 and 5 are repeated with the exception that, instead of diphenyl ether, there are used the following inert additives in individual runs:

(a) Ditolyl ether
(b) Ethyl phenyl ether
(c) Hexyl phenyl ether
(d) Dibenzyl ether
(e) Dicyclohexyl ether
(f) Bis(2-ethoxyethyl) ether
(g) Xylene
(h) Dowtherm A (a mixture of diphenyl ether and diphenyl)
(i) Bayol D, which is understood to be a product of a deodorized kerosene fraction, B.P., 204°–260° C. at atmospheric pressure
(j) Aroclor 1221 (chlorinated diphenyl)
(k) Alpha-methylnaphthalene Similar results are obtained.

Instead of using 10% of the inert additive, based on the weight of the terephthalate or of the isophthalate salt, as in the foregoing examples, the amount thereof may be considerably varied therefrom, e.g., from 2 to 25%, more particularly from 5 to 15%, and preferably (for instance when using diphenyl ether) from 8 to 12%. All the foregoing percentages are weight percents based on the weight of the polymer precursor.

*Example 12*

Same as in Example 4 with the exception that instead of 10 weight percent of diphenyl ether there is used a mixture of 2.5 weight percent of water and 2.5 weight percent of diphenyl ether. Similar results are obtained.

The values of inherent viscosity given above were determined from solutions of polymer in concentrated sulfuric acid of 98% $H_2SO_4$ concentration at 25° C. containing 0.4 gram of polymer per deciliter of acid.

The plugging values given above were determined by filtering a solution of polymer having a concentration in 98% $H_2SO_4$ of 0.4 to 6.0 grams of polymer per deciliter of acid at about 25° C. through a 2-inch Gelman filter composed of a piece of glass-fiber filter paper supported by a perforated stainless steel disc covered with a fine mesh stainless steel screen (70 wires to the inch), tack-welded to its top side. The perforations were 1/16 inch holes, 4 millimeters apart and arranged in a hexagonal pattern. The filtration area was 15 sq. cm.

A vacuum was maintained at the outlet side of the filter or a pressure was maintained on the inlet side of the filter so that the pressure drop across the filter was about 1 atmosphere. The volume V of polymer solution filtrate and the total time period $t$ of filtration were recorded every minute or every few minutes. After the filtration of at least 200 ml., values of $t/V$ as ordinate were plotted against corresponding values of $t$ as abscissa and the best straight line was drawn through the points. If the points substantially defined a continuous straight line, the reciprocal of the slope of this straight line was multiplied by the polymer concentration of the solution in grams per volume unit and divided by the area of the filter in square centimeters to obtain the plugging value. If the points did not yield a continuous straight line, the alternative method described above for obtaining the plugging value, i.e., based on the slope of the best straight line drawn through the points representing the highest degree of plugging, was used. The plugging values determined by both methods are substantially equivalent.

From the foregoing description it will be seen that the present invention provides a method of lessening the time required to convert polyamide-precursor material adapted to polymerize by condensation polymerization to a high-molecular-weight, difficultly-meltable, fiber-forming linear polyamide. Briefly described, in its broader aspects, the method comprises subjecting the aforesaid precursor material to a condensation-polymerization temperature while admixed with a minor amount of a polymerization reaction accelerator comprised of at least one member of the group consisting of (a) acids of phosphorus of the kind embraced by Formula I and (b) diamine salts of the acids of (a). In this way the aforementioned precursor material is converted to a fiber-formable linear polyamide in a shorter period of time than that required to produce a fiber-formable linear polyamide, having approximately the same inherent viscosity, from the same precursor material in the absence of the said reaction accelerator. Additionally, the fiber-formable linear polyamides produced in accordance with this invention have an improved inherent viscosity/plugging value relationship, and a decreased tendency to adhere to metal parts of the reactor than do those polyamides that are made from the same precursor material in the absence of the reaction accelerator used in practicing this invention but under otherwise comparable conditions.

It is to be understood that the foregoing detailed description is given merely by way of illustration and that many variations may be made therein without departing from the spirit of my invention.

The embodiments of the invention in which an exclusive property or privilege is claimed are defined as follows:

1. The method of lessening the time required to convert polyamide-precursor material adapted to polymerize by condensation polymerization to a difficultly-meltable fiber-forming linear polyamide, said method comprising subjecting the said precursor material to a condensation-polymerization temperature ranging from about 60° C. below the melting point of said precursor material up to the melting point of the polymerizing mass while admixed with a minor amount of a polymerization-reaction acceleraor comprised of at least one member of the group consisting of (a) acids of phosphorus represented by the general formula

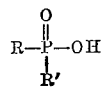

wherein R represents a radical of the group consisting of aryl and alkaryl radicals, and R' represents a member of the group consisting of hydrogen, alkyl, aralkyl, aryl and alkaryl radicals, and (b) diamine salts of the acids of (a), whereby the said precursor material is converted to a fiber-formable linear polyamide in a shorter period of time than that required to produce a fiber-formable linear polyamide, having approximately the same inherent viscosity, from the same precursor material in the absence of the said reaction accelerator, the aforesaid polyamide-precursor material being a salt of a diamine and a carbocyclic dicarboxylic acid.

2. The method as in claim 1 wherein the polymerization-reaction accelerator of the polyamide-precursor material defined in said claim is an acid of phosphorus represented by the general formula

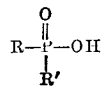

where R represents a radical of the group consisting of aryl and alkaryl radicals, and R' represents a member of the group consisting of hydrogen, alkyl, aralkyl, aryl and alkaryl radicals.

3. The method as in claim 2 wherein the polyamide-precursor material is a salt of a carbocyclic dicarboxylic acid and a diamine represented by the general formula

where $n$ represents an integer from 2 through about 20; and the polymerization-reaction accelerator is an aryl phosphinic acid.

4. The method as in claim 2 wherein the polyamide-precursor material is hexamethylene diammonium terephthalate; and the polymeriztaion-reaction accelerator is phenyl phosphinic acid.

5. The method as in claim 1 wherein the polymerization-reaction accelerator constitutes from 0.05 to 5 mole percent based on the number of moles of the polyamide-precursor material.

6. The method as in claim 1 wherein there is additionally admixed with the polyamide-precursor material and the reaction accelerator a minor amount, based on the weight of the said precursor material, of an inert compound having an atmospheric boiling point of at least 110° C. and at least part of said inert compound remaining in liquid state during at least part of the polymerization reaction, and the condensation-polymerization temperature being within the range extending from 60° C. below the melting point of the said precursor material up to the melting point of the polymerizable mass.

7. The method as in claim 6 wherein the inert compound is diphenyl ether in an amount corresponding to from 2 to 25 weight percent based on the weight of the said salt.

8. The process of producing polyhexamethylene terephthalamide from finely divided hexamethylene diammonium terephthalate salt comprising subjecting an admixture of said salt and a polymerization-reaction accelerator under autogenous pressure to a condensation-polymerization temperature ranging from about 60° C. below the melting point of said salt up to the melting point of the polymerizing mass, said reaction accelerator constituting from 0.1 to 5 mole percent based on the number of moles of the said terephthalate salt, and the said accelerator being comprised of at least one member of the group consisting of (a) acids of phosphorus represented by the general formula $$R-\underset{R'}{\underset{|}{P}}(=O)-OH$$

wherein R represents a radical of the group consisting of aryl and alkaryl radicals, and R' represents a member of the group consisting of hydrogen, alkyl, aralkyl, aryl and alkaryl radicals, and (b) diamine salts of the acids of (a), whereby the reaction period for forming the said polyhexamethylene terephthalamide is lessened.

9. The process as in claim 8 wherein the autogenous pressure is reduced to a pressure ranging from the vapor pressure of the reaction mass to 100 p.s.i.g.; the reaction is continued at the latter pressure for a period of at least 5 minutes while maintaining the polymerization temperature; and the reaction accelerator constitutes from 0.1 to 1 mole percent based on the number of moles of the defined terephthalate salt.

10. The process as in claim 8 wherein there is additionally admixed with the hexamethylene diammonium terephthalate salt and the reaction accelerator an inert compound having an atmospheric boiling point within the range of from 110° C. to 300° C., said inert compound constituting from 2 to 25 weight percent based on the weight of the said salt.

11. The process as in claim 10 wherein the inert compound is an ether having at least one aromatic hydrocarbon substituent, and the amount thereof constitutes from 5 to 15 weight percent based on the weight of the terephthalate salt.

12. The process as in claim 10 wherein the reaction accelerator is phenyl phosphinic acid and the inert compound is diphenyl ether in an amount corresponding to from 5 to 15 weight percent based on the weight of the said terephthalate salt.

13. The process which comprises:
I. heating under autogenous pressure at a polymerization temperature of at least 240° C. for a period of at least 10 minutes a mixture of
   (A) hexamethylene diammonium terephthalate salt,
   (B) a polymerization-reaction accelerator comprised of at least one member of the group consisting of (a) acids of phosphorus represented by the general formula $$R-\underset{R'}{\underset{|}{P}}(=O)-OH$$

wherein R represents a radical of the group consisting of aryl and alkaryl radicals, and R' represents a member of the group consisting of hydrogen, alkyl, aralkyl, aryl and alkaryl radicals, and (b) diamine salts of the acids of (a), the reaction accelerator of (B) being present in an amount corresponding to from 0.1 to 1 mole percent based on the number of moles of the salt (A), and
   (C) an inert compound having a boiling point at atmospheric pressure within the range of from 110° C. to 275° C., and being present in the admixture in an amount corresponding to from 5 to 15 weight percent based on the weight of the said terephthalate salt,
   and the heat expended in maintaining the aforesaid polymerization temperature being insufficient to completely melt the reaction mass containing the ingredients of (A), (B) and (C);
II. reducing said autogenous pressure to a pressure ranging from the vapor pressure of the mass to 100 p.s.i.g. while maintaining said polymerization temperature over a period of at least 10 minutes during said reduction; and
III. maintaining the polymerization temperature at said latter pressure for a period of at least 5 minutes.

14. The process as in claim 13 wherein the reaction accelerator of (B) is phenyl phosphinic acid; the inert compound of (C) comprises diphenyl ether; the maximum polymerization-reaction temperature is within the range of 260° to 325° C.; and the maximum pressure reached during polymerization under autogenous pressure is within the range of from 300 to 1200 p.s.i.g.

References Cited

UNITED STATES PATENTS 2,981,715   4/1961   Ben _____ 260—78
3,232,909   2/1966   Werner _____ 260—78

FOREIGN PATENTS 910,123   11/1962   Great Britain.

WILLIAM H. SHORT, *Primary Examiner.*
H. D. ANDERSON, *Assistant Examiner.*